(12) United States Patent
Ahmed

(10) Patent No.: US 9,568,593 B2
(45) Date of Patent: Feb. 14, 2017

(54) METHOD, SYSTEM AND CALIBRATION TARGET FOR THE AUTOMATIC CALIBRATION OF AN IMAGING ANTENNA ARRAY

(71) Applicant: Rohde & Schwarz GmbH & Co. KG, Munich (DE)

(72) Inventor: Sherif Sayed Ahmed, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 351 days.

(21) Appl. No.: 14/353,047

(22) PCT Filed: Feb. 20, 2013

(86) PCT No.: PCT/EP2013/053346
§ 371 (c)(1),
(2) Date: Apr. 21, 2014

(87) PCT Pub. No.: WO2013/135469
PCT Pub. Date: Sep. 19, 2013

(65) Prior Publication Data
US 2014/0247182 A1    Sep. 4, 2014

(30) Foreign Application Priority Data

Mar. 16, 2012 (DE) .................. 10 2012 204 174

(51) Int. Cl.
*G01S 7/40* (2006.01)
*H01Q 3/26* (2006.01)
(Continued)

(52) U.S. Cl.
CPC .............. *G01S 7/4026* (2013.01); *G01S 13/89* (2013.01); *H01Q 3/267* (2013.01)

(58) Field of Classification Search
CPC ............ G01S 7/02; G01S 7/40; G01S 7/4004; G01S 7/4026; G01S 13/88; G01S 13/89; G01S 7/4008; G01S 7/4017; G01S 7/4021; G01S 13/74; G01S 13/75; G01S 13/751; G01S 13/756; H01Q 3/26; H01Q 3/267; H01Q 3/02; H01Q 3/04; G01R 29/08; G01R 29/10
See application file for complete search history.

(56) References Cited

U.S. PATENT DOCUMENTS 2,421,016 A  *  5/1947  Labin .................. G01S 7/40
                                                  342/172
2,656,533 A  *  10/1953 London ................ G01S 7/40
                                                  342/173
(Continued)

FOREIGN PATENT DOCUMENTS

DE    10 2005 059301 A1    6/2006
WO    2004/003586 A1       1/2004

OTHER PUBLICATIONS

International Preliminary Report on Patentability and Written Opinion issued in corresponding application No. PCT/EP2013/053346 on Sep. 16, 2014.
(Continued)

*Primary Examiner* — Bernarr Gregory
(74) *Attorney, Agent, or Firm* — Carter, DeLuca, Farrell & Schmidt, LLP

(57) ABSTRACT

The system (1) is used for the automatic calibration of an imaging-antenna arrangement (2) using an evaluation unit (4). The antenna arrangement (2) transmits signals (6) and receives the signals (6') reflected from a calibration object (3) of known shape. The calibration object (3, 31, 32) provides at least one diffuse reflector (8). In the evaluation method, position coordinates of the calibration object (3) are entered, and the following method steps are implemented after the measurement of the reflected signals (6'):
(Continued)

i. Calculation of the reflections of the calibration object (3, 31, 32),
ii. Calculation of calibration data,
iii. Preparation of an image of the calibration object with the use of the calibration data,
iv. Determination of corrected position coordinates by evaluating the image of the at least one diffuse reflector,
v. Implementation of steps i. to iv. with corrected position coordinates.

20 Claims, 2 Drawing Sheets

(51) Int. Cl.
*H01Q 15/14* (2006.01)
*G01S 13/89* (2006.01)
*G01S 7/00* (2006.01)
*G01S 13/00* (2006.01)
*H01Q 3/00* (2006.01)
*H01Q 15/00* (2006.01)

(56) References Cited

U.S. PATENT DOCUMENTS

| | | | | |
|---|---|---|---|---|
| 3,108,275 A * | 10/1963 | Chisholm | G01S 13/756 | 342/34 |
| 3,158,862 A * | 11/1964 | Chisholm | G01S 13/756 | 342/11 |
| 3,308,464 A * | 3/1967 | Lewis | G01S 13/756 | 342/6 |
| 3,568,194 A * | 3/1971 | Wilson | G01S 13/756 | 342/14 |
| 3,573,826 A * | 4/1971 | Fredericks | G01S 7/4021 | 342/174 |
| 3,623,091 A * | 11/1971 | Mayo, Jr. | G01S 13/756 | 342/6 |
| 4,283,725 A * | 8/1981 | Chisholm | G01S 7/40 | 342/174 |
| 4,531,126 A * | 7/1985 | Sadones | G01R 29/10 | 340/13.37 |
| 4,926,186 A * | 5/1990 | Kelly | H01Q 3/267 | 342/173 |
| 5,187,486 A * | 2/1993 | Kolzer | H01Q 3/267 | 342/173 |
| 5,294,934 A * | 3/1994 | Matsumoto | H01Q 3/267 | 342/169 |
| 5,294,935 A * | 3/1994 | Bauerle | G01S 7/4004 | 342/174 |
| 5,477,229 A * | 12/1995 | Caille | H01Q 3/267 | 342/173 |
| 5,546,090 A * | 8/1996 | Roy, III | H01Q 3/267 | 342/174 |
| 6,535,160 B1 * | 3/2003 | Myers | G01S 7/4026 | 342/165 |
| 6,771,216 B2 * | 8/2004 | Patel | H01Q 3/267 | 342/174 |
| 6,777,684 B1 | 8/2004 | Volkov et al. | | |
| 6,778,131 B2 * | 8/2004 | Haney | G01S 7/4026 | 342/165 |
| 6,977,624 B1 * | 12/2005 | Szente | H01Q 3/04 | 342/8 |
| 7,046,191 B2 * | 5/2006 | Tokutsu | G01S 7/4026 | 342/165 |
| 7,068,218 B2 * | 6/2006 | Gottl | H01Q 3/267 | 342/368 |
| 7,446,698 B2 * | 11/2008 | Bast | G01S 7/4017 | 342/174 |
| 7,548,189 B2 * | 6/2009 | Alon | G01S 7/4026 | 342/149 |
| 7,583,229 B2 * | 9/2009 | Apostolos | H01Q 3/267 | 342/174 |
| 7,925,251 B2 * | 4/2011 | Hochdorf | G01S 7/4017 | 342/172 |
| 8,102,298 B2 * | 1/2012 | Feigin | G01S 7/4008 | 342/159 |
| 8,169,355 B2 * | 5/2012 | Bartscher | H01Q 3/04 | 342/165 |
| 8,184,042 B2 * | 5/2012 | Ray | H01Q 3/267 | 342/174 |
| 8,842,040 B1 * | 9/2014 | Dorsey | H01Q 3/267 | 342/174 |
| 8,847,816 B2 * | 9/2014 | Feil | G01S 7/40 | 342/128 |
| 9,019,153 B1 * | 4/2015 | Schuss | G01S 7/4026 | 342/165 |
| 2006/0245628 A1 | 11/2006 | Jeung et al. | | |
| 2009/0294704 A1 | 12/2009 | Zailer et al. | | |

OTHER PUBLICATIONS

Ahmed, et al. "A Novel Fully Electronic Active Real-Time Imager Based on a Planar Multistatic Sparse Array", IEEE Transactions on Microwave Theory and Techniques, Nov. 2011, vol. 59. No. 12, pp. 3567-3576.

International Search Report issued in corresponding application No. PCT/EP2013/053346 on Jun. 12, 2013.

\* cited by examiner

METHOD, SYSTEM AND CALIBRATION TARGET FOR THE AUTOMATIC CALIBRATION OF AN IMAGING ANTENNA ARRAY

TECHNICAL FIELD

The invention relates to a method and a system for the automatic calibration of an imaging-antenna arrangement using an evaluation device, in which the antenna arrangement transmits signals and receives the signals reflected from the calibration object.

BACKGROUND

Active imaging-antenna arrangements for the millimeter and microwave range are becoming increasingly important as a result of their diversity of possible uses in the fields of medicine and industry.

Such antenna arrangements comprise a plurality of individual transmission and reception antennas, whereas each antenna transmits a signal in succession, which is reflected from an object, and the reflected signal is received by all of the reception antennas. This is performed either at a single frequency or stepwise at different frequencies. In this context, both the amplitude and the phase of the received signal are measured. Using a digital beam-forming algorithm (digital beam-forming), it is possible to calculate back from this to the corresponding object points, which have reflected the received signal, and accordingly, an image of the entire reflected body can be prepared.

Such an antenna arrangement is described, for example, in an article in "IEEE Transactions on Microwave Theory and Techniques", Vol. 59, No. 12, pages 3567-3576, December 2011, entitled "A Novel Fully Electronic Active Real Time Imager Based on a Planar Multi-static Sparse Array". To ensure that the focusing process for such an antenna arrangement functions with a digital beam-forming method, a well-defined phase must be present between the individual transmitter and receiver pair. In order to achieve this, a calibration of every transmitter/receiver pair is implemented. In an antenna device with hundreds or thousands of transmitter and receiver units, a measurement of the direct connection of every combination is not possible. Accordingly, the calibration of an antenna device which operates in the reflection mode using a calibration object which provides a simple and regular geometry is described in the above-named article. The measurements with the calibration object are then compared with simulation results or with previous reference measurements in order to calculate the systematic error in the antenna device. These investigated errors are determined for every transmitter/receiver pair, for all frequencies used. For this purpose, for example, a metal plate positioned at a predetermined distance is used as the calibration object.

One major problem with this calibration method is that the relative position between the calibration object and the antenna device must itself be observed very accurately. Since these antenna devices operate in the millimeter-wave range, the spacing distance between the calibration object and the antenna device, as well as the position and the orientation of the calibration object must be known with greater accuracy than one wavelength, whereas the spacing distance between the antenna device and the calibration object corresponds to hundreds of wavelengths. With a maximum the phase error of 5° and a signal wavelength of 100 GHz, an accuracy of approximately 40 μm in the spacing distance is therefore required. Such accuracy can only be achieved with very high mechanical costs.

SUMMARY

The object of the present invention is therefore to provide a method, a system and a calibration object for the calibration of such an antenna device, with which a calibration is possible without meeting these extremely high demands with regard to accuracy in the spacing distance between the antenna device and the calibration object.

The object is achieved by the device according to the invention with the features of the method, the system and a calibration object. The dependent claims specify advantageous further developments of the method, the system and the calibration object according to the invention.

The method according to the invention for the automatic calibration of an imaging-antenna arrangement is performed using an evaluation device, whereas the antenna arrangement operates in the reflection mode, that is, signals are transmitted, and the signals reflected from a calibration object are received, and the calibration object provides at least one diffuse reflector. Estimated position coordinates of the calibration object are entered, and, after the measurement of the reflected signals, the reflections of the calibration object are calculated. Following this, the calibration data are calculated, that is, the phase ratio between the observed transmitter and the observed receiver is determined. An image of the calibration object is then prepared using the calibration data. Corrected position coordinates are determined by evaluating the image of the at least one diffuse reflector, and a new calculation of the reflections of the calibration object and the further steps are implemented with these corrected position data. When the resolution of the image of the diffuse reflectors is satisfactory, the evaluation is ended.

The method described has the advantage that the position of the calibration object only needs to be entered roughly, and the exact position is determined numerically. Since the exact position is of great importance for the calibration, this can now be considerably improved, and accordingly, the measurement accuracy of the antenna arrangement can be improved.

It is particularly advantageous if the image of the at least one diffuse reflector is evaluated with regard to brightness and/or resolution and/or distortion. If the entered position of the calibration object does not agree exactly with its actual position, on the one hand, the calibration data are not accurate, and the image of the calibration object and especially of the at least one diffuse reflector are blurred. This can be expressed through reduced brightness, coarse resolution or distortion in the shape of the diffuse reflector. A deviation of the actual position coordinates of the calibration object from the entered position coordinates can be inferred from these image properties. For example, a reduced brightness of the image of the diffuse reflector indicates an error in the spacing distance perpendicular to the antenna arrangement.

It is particularly advantageous if the distortion is evaluated with regard to shape and orientation. In particular, a deviation in the inclination $\phi_{x-y}$ and $\phi_{x-z}$ of the calibration object in the x-y- or respectively x-z-plane can be inferred, by comparison with the position coordinates entered. Accordingly, a correction of the position coordinates, which are advantageously described by a spatial coordinate (x, y, z) and the inclination relative to a reference plane ($\phi_{x-y}$, $\phi_{x-z}$) can be achieved in a particularly targeted manner.

Moreover, it is advantageous to use a numerical optimisation method to determine the corrected position coordinates. Such a numerical optimisation method is advantageously applied to the image of respectively one diffuse reflector and/or several diffuse reflectors at the same time. In this manner, a correction of the position with regard to spacing distance and also orientation of the calibration object can be determined in a targeted manner from the images of the diffuse reflectors.

A gradient method or a genetic optimisation algorithm is advantageously used as the optimisation method. In this context, imaging errors from several diffuse reflectors can be taken into consideration simultaneously, and a correction based on images from all of the diffuse reflectors can be considered in combination.

A system according to the invention for the automatic calibration of an imaging-antenna arrangement comprises an evaluation device and a calibration object which has a reflecting surface and faces towards the antenna arrangement, whereas the antenna arrangement transmits signals and measures signals reflected from the calibration object which are evaluated by the evaluation device, whereas the calibration object provides a diffuse reflector directed towards the antenna arrangement, and the diffuse reflector reflects in a diffuse manner signals which strike it.

The signals reflected with high intensity from the reflecting surface of the calibration object are used to determine the calibration data. By contrast, signals striking the diffuse reflector are reflected isotropically, in all directions and provide a negligible intensity in every direction by comparison with the signals reflected from the reflecting surface, so that they make a negligible contribution to the calibration data and do not therefore falsify the latter. The at least one diffuse reflector is only visible in the case of a generation of an image of the calibration object by an imaging method of the antenna arrangement or respectively in the evaluation device. Accordingly, the diffuse reflector can be used to determine the position between the calibration object and the antenna arrangement without interfering with the calibration itself.

It is advantageous if the calibration object provides a flat surface, a cylindrical surface and/or an ellipsoid surface. These surface shapes are simple, can be manufactured with high precision and can also be described mathematically very accurately. Accordingly, any error in the simulation of the surface of the calibration object is minimised. Furthermore, its reflection behaviour can be easily calculated.

The at least one diffuse reflector is advantageously arranged on or near the reflecting surface. On the one hand, this achieves a good contrast in the imaging of the diffuse reflector by comparison with the calibration object itself. On the other hand, diffuse reflectors arranged alongside the reflecting surface do not influence the determination of the calibration data at all. Moreover, the strongly reflecting surface is not disturbed by less strongly reflecting edge regions of the diffuse reflectors which inevitably occur during manufacture.

It is particularly advantageous if the diffuse reflector is embodied as a needle-shaped, metallic or metallised pin and provides a tip of which the spatial extension is in the order of magnitude of the wavelength of the signal. Such needle-shaped pins are simple to manufacture with tips with any spatial extension, as small as required. Signals with a wavelength which is larger than the spatial extension of the tip of the pin are reflected from the latter in a diffuse manner and therefore provide a diffuse reflecting property.

It is similarly advantageous if the diffuse reflector is embodied as a recess, for example, as a perforation in the calibration object. The edge region of such a recess also reflects in a diffuse manner.

It is particularly advantageous if the diffuse reflector provides a round or cruciform contour. A round contour is particularly advantageous because it is simple to manufacture accurately, so that image disturbances can be quantified very precisely. A cruciform contour of a diffuse reflector provides a good reference system for distortions occurring as a result of its orientation and because of the predetermined angle between the crossing straight lines. In particular, distortions can be analysed accurately with regard to their orientation and can therefore provide information about the inclination of the calibration object.

It is advantageous if the evaluation unit provides an entry unit for entering position coordinates of the calibration object, a first calculation unit for calculating the surface of the calibration object and a second calibration unit for calculating calibration data. Furthermore, the evaluation unit preferably provides an imaging unit for preparing an image of the calibration object using the calibration data, a correction unit for determining corrected position coordinates by evaluating the image of the at least one diffuse reflector and an iteration unit which transfers the corrected position coordinates once or several times to the first calculation unit. Such an evaluation unit ensures that, by evaluating the image of the at least one diffuse reflector, new corrected position coordinates for the calibration object can be determined and these can be prepared as a basis for calculating new calibration data with improved information regarding the position of the surface of the calibration object, and indeed, so often until a satisfactory image is determined, especially of the diffuse reflectors, and accordingly until an exact positioning of the calibration object and from this, precise calibration data, are determined.

A calibration object according to the invention for the automatic calibration of an imaging-antenna arrangement provides a known shape with a reflecting surface, whereas the calibration object provides at least one diffuse reflector directed towards the antenna arrangement on or near the reflecting surface, and the diffuse reflector reflects in a diffuse manner signals which strike it, whereas the diffuse reflector is embodied as a needle-shaped, metallic or metallised pin and provides a tip of which the spatial extension is in the order of magnitude of the wavelength of the signals, and/or the diffuse reflector is embodied as a recess, and/or the diffuse reflector provides a material with a surface reflecting in a diffuse manner and provides a round and/or cruciform contour.

BRIEF DESCRIPTION OF THE DRAWINGS

Exemplary embodiments of the system according to the invention, of a calibration object according to the invention and of the method according to the invention are presented by way of example in the drawings and explained in greater detail with reference to the following description. The drawings show.

DETAILED DESCRIPTION

Mutually corresponding parts are provided with the same reference numbers in all of the drawings.

Figure 1:
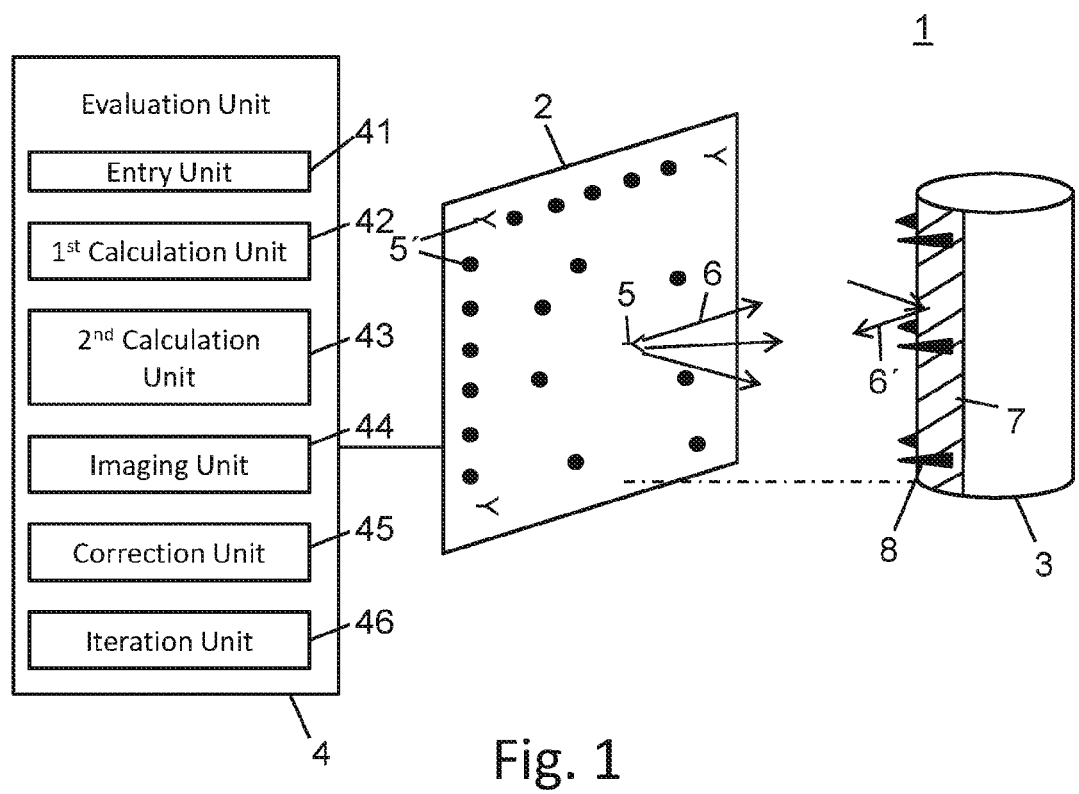
FIG. 1 is an exemplary embodiment of the system according to the invention with a first exemplary embodiment of a calibration object according to the invention in a perspective view.

FIG. 1 shows a system 1 for the automatic calibration of an antenna arrangement 2 using an evaluation unit 4 which is connected to the antenna arrangement 2. The antenna arrangement 2 comprises a plurality of antennas 5, which operate respectively as transmitters and/or as receivers. In this context, the antenna arrangement can have a flat or curved, for example, cylindrical, shape. In order to generate an image of, for example, an object, the antenna arrangement 2 is operated in a multi-static manner, so that, in each case, an antenna 5 transmits a signal 6. The signals 6' reflected from an object, in this case, a calibration object 3, are received by every antenna 5' apart from the transmission antenna 5, and measured in amplitude and phase. The signals 6, 6' preferably provide a frequency in the range between 30 GHz and 500 GHz, by particular preference, in the range between 50 GHz and 200 GHz.

These data are routed to the evaluation unit 4. In this context, the measured signals 6' are calculated back, using a digital beam-forming algorithm, to the reflected object points, thereby generating an image of the object as a whole. Instead of a purely electronic beam-forming, the beam-forming can be achieved with a semi-mechanical antenna arrangement 2.

In order to prepare a clear, high-resolution image, the phase angle between every possible transmitter/receiver antenna pair must be known exactly. In order to determine this phase angle, a calibration measurement is performed on a calibration object 3 with precisely known surface structure and precisely known spacing distance between the antenna arrangement 2 and every point on the surface of the calibration object 3.

FIG. 1 shows a calibration object 3 with cylindrical surface, which provides a strongly reflecting, mirrored surface 7 especially in the region facing towards the antenna arrangement. On or near to the mirrored surface 7, at least one diffuse reflector 8, in the present case, several diffuse reflectors 8, are arranged at the lateral edge of the mirrored surface 7. In this context, the diffuse reflectors 8 face in the direction towards the antenna arrangement 2. The shape and size of the calibration object is selected in such a manner that reflected signals 6' are received uniformly over the entire antenna arrangement 2, so that measured values are provided for every transmitter-/antenna pair.

The measured signals are routed to the evaluation unit 4. The position coordinates of the calibration object 3 are entered using an entry unit 41 of the evaluation unit 4, for example, through the position of a point on the calibration object (x, y, z) and its angles of inclination $\phi_{x-y}$ and $\phi_{x-z}$, for example, by comparison with the plane of the antenna. Following this, the position of the surface of the calibration object 3 is determined from the position coordinates, and the reflected signals expected from this calibration object are calculated. A first calculation unit 42 provides the corresponding means for this. A second calculation unit 43 is embodied to calculate the calibration data from the measured signals and the calculated reflections and to buffer the latter for subsequent image calculations. Taking into consideration these calibration data, an image of the calibration object 3 is generated. The means for this are provided in an imaging unit 44.

Figures 3, 4:
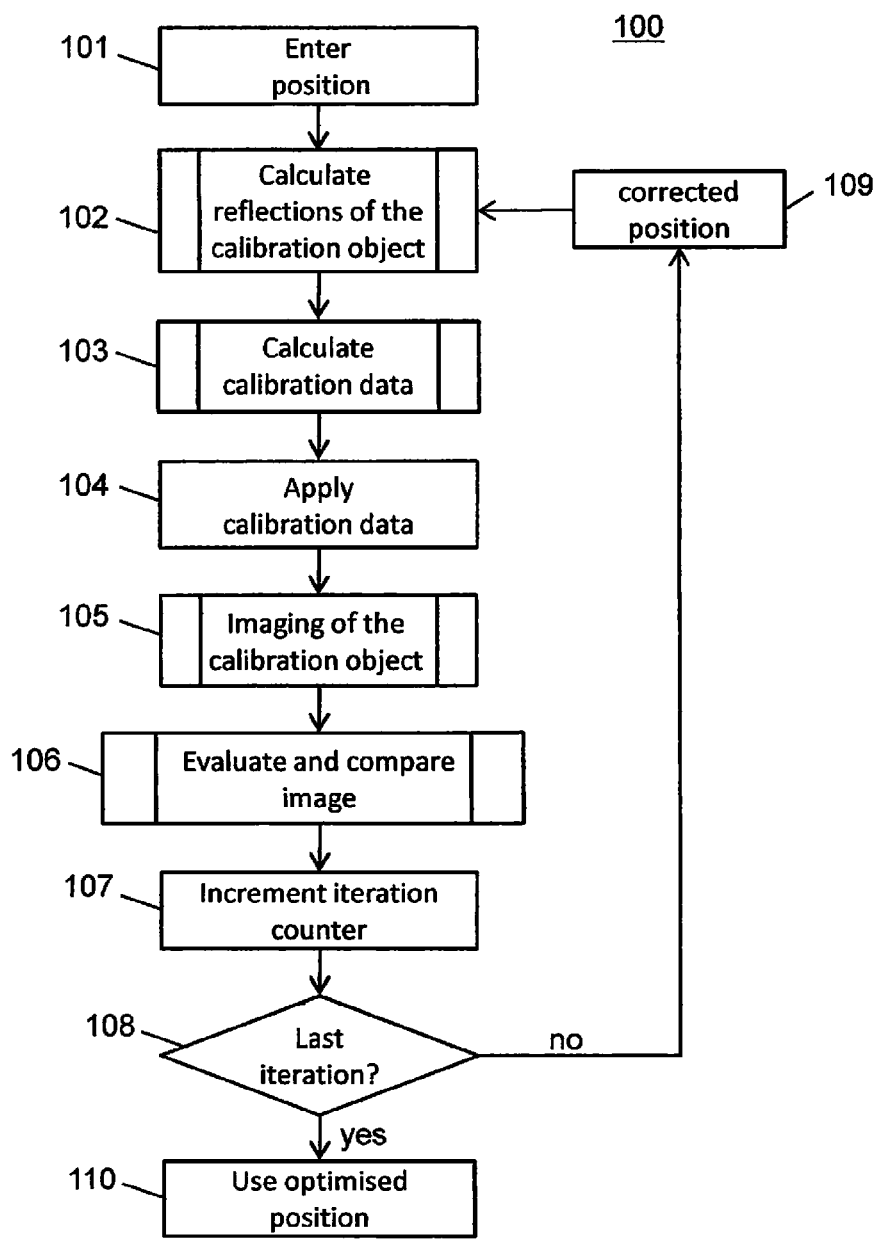
FIG. 3 shows exemplary images of a diffuse reflector according to the invention.
FIG. 4 is an exemplary embodiment of the method according to the invention as a flow chart.

As a result of the position coordinates which are not accurately known, the images of the diffuse reflectors 8 show disturbances. In FIG. 3, different images of a diffuse reflector 8 with a round contour are shown. In this context, the image 20 represents an ideal image with clearly demarcated contour and a high level of brightness. By contrast, image 21 of the diffuse reflector 8 shows a poor resolution, that is, a relatively larger diameter with a diffuse contour. Images 22 and 23 show a distorted image of the diffuse reflector 8, whereas a distortion in the x-direction is shown in image 22, and a distortion in the x-y direction is shown in image 23. Image 24 provides a poor brightness and accordingly suggests an error in the distance coordinates. Deviations in the inclination of the calibration object from the assumed position can be inferred from distortions such as those in images 22 and 23.

The images of the diffuse reflectors are evaluated using numerical optimisation methods. In this context, appropriate methods are, for example, a gradient method or a heuristic method, especially the genetic optimisation algorithm, which determines correction values for the position coordinates of the calibration object, for example, from the area of the image and the orientation of distortions. These correction values also include an evaluation of the resolution and the brightness of the images. A correction unit 45 of the evaluation unit 4 provides the means necessary for this.

Correspondingly corrected, new position coordinates are now used for a re-calculation of the position of the surface, and from this, the anticipated, reflected signals of the calibration object, and new calibration data are calculated on this basis. Taking into consideration these new calibration data, an image of the calibration object is generated again, and corrections of the position coordinates are calculated from the display of the diffuse reflectors. This is repeated until a satisfactory image of the diffuse reflectors is achieved. An iteration unit 46 of the evaluation device 4 comprises means which control the repetition of the evaluation.

Figures 2A, 2B:
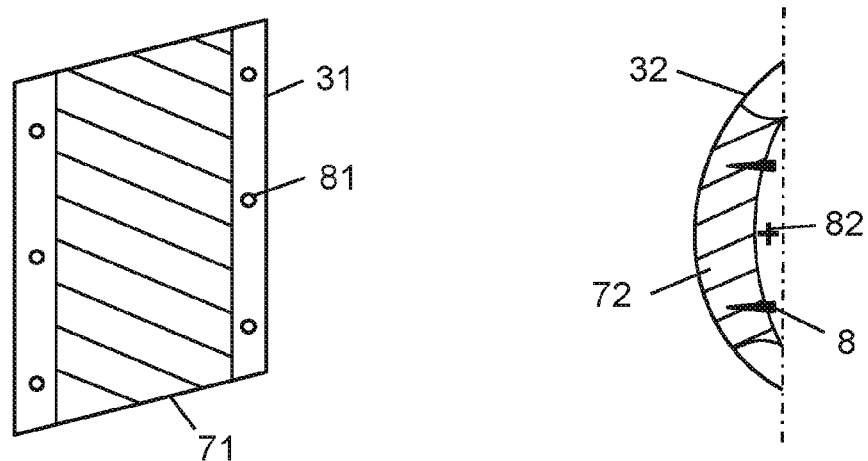
FIG. 2A is a second exemplary embodiment of a calibration object according to the invention in a perspective view.
FIG. 2B is a third exemplary embodiment of a calibration object according to the invention in a lateral view.

FIG. 2A shows a further exemplary embodiment of a calibration object 31 with a flat reflecting surface 71. Several diffuse reflectors 81 arranged distributed near the reflecting surface 71 provide a round contour and are embodied, for example, as recesses or perforations in the calibration object 31, which is made from a metallic material. In particular, the signals are reflected in a diffuse manner at the edges of such recesses. Diffuse reflectors 81 which are fixed to the surface of the calibration object 31 can, alternatively, be made from a material with a diffuse surface. In this context, the position of every individual diffuse reflector 81 in the x-y direction and also with regard to the spacing distance z from the antenna arrangement is known accurately.

FIG. 2B shows a lateral view of a calibration object 32 with an ellipsoid surface. In this context, only the surface facing towards the antenna arrangement is shown. The shape of the calibration object 32 at the side facing away from the antenna arrangement 2 can be embodied arbitrarily and is not relevant to the calibration. The reflecting region of the surface 72 is also illustrated with hatching here.

Several diffuse reflectors 82 are arranged at the edge of the reflecting surface 72. The diffuse reflector 82 provides a cruciform contour and, as already mentioned, can be embodied as a recess or can be formed from a material with a diffuse reflecting surface. The diffuse reflectors are formed, for example, by a metallic pin, of which the tip provides a spatial extension in the same order of magnitude as the wavelength of the signals. In this context, values in the same order of magnitude are understood to mean values within an interval of one decade around the wavelength of the signal, that is, values within an interval with a maximum factor of 3.3 and a minimum factor of 0.33 of the observed wavelength. In this context, in particular, the tip acts as a diffuse reflector from which signals are reflected in an isotropic manner in all directions. These needle-shaped metallic or metallised pins are preferably arranged facing towards the antenna arrangement. The spacing distance of the tip from the surface of the calibration object 32 must be known precisely. Such needle-shaped diffuse reflectors are particularly suitable in the case of signals with a particularly high-frequency and therefore a very short wavelength.

With reference to FIG. 4, the method 100 of the automatic calibration of an imaging-antenna arrangement will be explained in the form of a flow chart. The method 100 can be embodied, for example, as a computer program which is executed in an evaluation unit 4.

For the calibration, it is sufficient to perform a single measurement with the calibration object at one frequency or optionally also at several frequencies. As an alternative, several measurements in which the calibration object is positioned at different positions can also be implemented.

For the automatic calibration, the known position of the calibration object 3, 31, 32, associated with an inaccuracy, is now determined in method step 101 by specifying position coordinates. The distance of every point on the surface of the antenna arrangement 2 is known from the position coordinates and the known shape of the calibration object 3, 31, 32.

In step 102, the anticipated reflections of the calibration object 3, 31, 32 are calculated. By comparing the measured, reflected signals with the calculated reflections, the phase angle of the individual transmitter/receiver antenna pairs is calculated and buffered as calibration data for the further calculation of images of any objects required, see step 104. Using these calibration data, an image of the calibration object 3, 31, 32 is now reconstructed in step 105.

Since all of the diffuse reflected signals striking the antenna arrangement 2 contribute to the image of a diffuse reflector, the diffuse reflector now becomes recognisable. The images of the diffuse reflectors are evaluated with reference to their shape, their brightness and their resolution, either individually or together via numerical optimisation methods. Correction values for the originally entered positioned data are calculated from these, see step 106.

After the calculation of correction values, for example, an iteration counter is incremented, see step 107. If a specified number of iterations has not yet been reached, new position coordinates are determined in step 109 with the correction values, and steps 102 to 106 are repeated. As an alternative, further iterations can be implemented, if, for example, the correction values exceed a given, specified threshold value. This is repeated until either the fixed number of iteration steps has been reached or the deviation falls below a fixed threshold value. When this is the case, the automatic calibration ends, in step 110, by fixing the determined, actual position or position coordinates.

With this method 100, it is possible to implement an exact calibration of the antenna device 2 from a position of the calibration object 3, 31, 32 which is only approximately known, so that the cost for the accurate positioning of the calibration object 3, 31, 32 is considerably reduced. Accordingly, the imaging method itself is used to determine the correction values.

The invention is not restricted to the exemplary embodiments presented. All of the features described and/or illustrated can be combined with one another as required within the scope of the invention.

The invention claimed is:

1. A method for automatic calibration of an imaging antenna array using an evaluation device and a calibration object, wherein the calibration object includes at least one diffuse reflector, and wherein position coordinates of the calibration object are entered, the method comprising:
   transmitting, by the imaging antenna array, signals;
   receiving the signals reflected from the calibration object;
   calculating expected reflections of the calibration object;
   calculating calibration data;
   preparing an image of the calibration object based on the calibration data;
   determining corrected position coordinates by evaluating a portion of the image, which corresponds to the at least one diffuse reflector; and
   iterating the calculating, preparing, and determining steps with the corrected position coordinates.

2. The method according to claim 1, further comprising evaluating the image of the at least one diffuse reflector with regard to brightness and/or resolution and/or distortion.

3. The method according to claim 2, wherein the evaluating step includes evaluating a distortion with regard to shape and orientation.

4. The method according to claim 1, wherein a numerical optimisation method is used to determine the corrected position coordinates.

5. The method according to claim 4, wherein the numerical optimisation method is applied to the portion of the image, which corresponds to the at least one diffuse reflector.

6. The method according to claim 4, wherein a gradient method or a heuristic algorithm is used as the optimisation method.

7. The method according to claim 6, wherein the heuristic algorithm is a genetic optimisation algorithm.

8. The method according to claim 1, wherein the position coordinates of the calibration object are defined by at least one spatial position.

9. The method according to claim 1, wherein the position coordinates of the calibration object are defined by the position coordinates (x, y, z) and two angles of inclination ($\phi_{x-y}$, $\phi_{x-z}$).

10. A system for automatic calibration of an imaging antenna array, comprising:
   an evaluation device; and
   a calibration object including a reflecting surface, which faces towards the imaging antenna array, and at least one diffuse reflector directed towards the imaging antenna array,
   wherein the imaging antenna array transmits signals and receives the signals reflected from the calibration object, wherein the evaluation device evaluates the received signals, and
   wherein the at least one diffuse reflector reflects in a diffuse manner signals which strike the at least one diffuse reflector.

11. The system according to claim 10, wherein the calibration object provides a flat surface and/or a cylindrical surface and/or an ellipsoid surface.

12. The system according to claim 10, wherein the at least one diffuse reflector is arranged on or near the reflecting surface.

13. The system according to claim 10, wherein the at least one diffuse reflector is a needle-shaped, metallic or metallised pin and provides a tip, of which a spatial extension is in a same order of magnitude as a wavelength of the signals transmitted from the imaging antenna array.

14. The system according to claim 10, wherein the at least one diffuse reflector is a recess.

15. The system according to claim 10, wherein the at least one diffuse reflector provides a round or cruciform contour.

16. The system according to claim 10, wherein the evaluation device includes:
   an entry unit for entry of position coordinates of the calibration object;
   a first calculation unit for calculating expected reflections of the calibration object for the imaging antenna array;
   a second calculation unit for calculating calibration data;
   an imaging unit for preparing an image of the calibration object using the calibration data;
   a correction unit for determining corrected position coordinates by evaluating a portion of the image, which corresponds to the at least one diffuse reflector; and
   an iteration unit which routes the corrected position coordinates once or several times to the first calculation unit.

17. The system according to claim 10, wherein the signals include a frequency in a range between 30 GHz and 500 GHz.

18. The system according to claim 10, wherein the signals have a frequency in a range between 50 GHz and 200 GHz.

19. A calibration object for automatic calibration of an imaging antenna array with a reflecting surface, comprising:
   at least one diffuse reflector directed towards the imaging antenna array on and/or near the reflecting surface, the at least one diffuse reflector reflecting in a diffuse manner signals which strike the at least one diffuse reflector,
   wherein the at least one diffuse reflector is a needle-shaped, metallic or metallised pin and provides a tip of which a spatial extension is in a same order of magnitude as a wavelength of the signals, or the at least one diffuse reflector is a recess, and
   wherein the at least one diffuse reflector is made from a material with a diffuse reflecting surface and provides a round or cruciform contour.

20. The system according to claim 19, wherein the calibration object provides a simple and regular geometry.

* * * * *